Patented Apr. 12, 1949

2,467,186

UNITED STATES PATENT OFFICE

2,467,186

AQUEOUS DISPERSIONS OF SYNTHETIC LINEAR POLYAMIDE AND PROCESS FOR OBTAINING SAME

Theodore Le Sueur Cairns, Wilmington, Del., assignor to E. I. du Pont de Nemours & Company, Wilmington, Del., a corporation of Delaware No Drawing. Application April 20, 1945, Serial No. 589,454

2 Claims. (Cl. 260—29.2)

This invention relates to aqueous dispersions of polymeric materials and a process for their preparation.

The preparation of stable aqueous dispersions of the high molecular weight polyamides has been attended with difficulty by reason of the tough or fibrous nature of these polymers which prevents satisfactory grinding and dispersion by the use of a colloid mill or by other methods readily applicable to other polymers. Although dispersions of considerable commercial value have been obtained previously, they have been prepared by a process which is time-consuming and, in addition, requires the use of organic solvents with the attendant toxicity and fire hazards and economic disadvantages. Aqueous emulsions of organic solvent solutions of polyamides have also been proposed and these have shown to possess considerable advantages, particularly from the standpoint of yielding continuous thin films on evaporation. Nevertheless, these emulsions also necessitate organic solvents. There has been, therefore, a great need for stable aqueous polyamide dispersions which have a high solids content, namely above 20%, and which are obtained without the use of organic solvents.

This invention has as an object the production of stable dispersions of polyamides which contain a high percentage of the dispersed polyamide and in which the dispersing medium consists essentially of water. A further object is a process for dispersing polyamides in water without the use of organic solvents. Other objects will appear hereinafter.

The above objects are accomplished by a method wherein polyamides of the particular kind described in more detail below are treated by a process comprising gradually milling water into the polyamide at a temperature below 100° C. in the presence of a dispersing agent until a polymer-in-water dispersion is formed.

The polyamides with which this invention is applicable are those which are rendered plastic at temperatures below 100° C. in the presence of water and capable of being milled in accordance with the present process. This property, which in general is a characteristic of the polyamides disclosed herein to exemplify the invention, can be readily determined by test.

Polyamides from which the improved dispersions described herein can be obtained include the N-substituted polyamides. These N-substituted polyamides are macromolecular polymers derived from the synthetic linear polyamides described in Patents 2,071,250, 2,071,253 and 2,130,-948; and are made by the methods described in my application Serial No. 539,195, filed June 7, 1944 now Patent No. 2,430,860. Although the initial polyamides described in the mentioned patents are as a class incapable of forming stable aqueous dispersions by the present process, dispersions of this kind which have a high solids content are readily obtained with the N-substituted polyamides which are polyamides in which the recurring carbonamide groups bear on the nitrogen the group —CH$_2$—O—R where R is the non-hydroxyl portion of an alcohol and preferably an alkyl or a hydrocarbon radical, in particular those polyamides which are sufficiently substituted to be soluble to the extent of at least 15% in hot (50–75° C.) 80% aqueous ethanol (80 parts by weight alcohol—20 parts by weight water). These N-substituted polyamides, which are also referred to as N-alkoxymethyl polyamides, have the recurring group

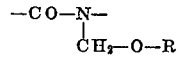

where R represents the non-hydroxyl portions of an alcohol as mentioned above.

Another type of polyamide with which the present dispersions can be made is the interpolyamide obtained by polymerizing a mixture consisting essentially of 20% to 60% of 6-aminocaproic acid, preferably used in the form of the caprolactam, and at least 10% each of at least two of the following three polyamide-forming compositions, namely, hexamethylenediammonium adipate; hexamethylenediammonium sebacate; and a mixture of from about 15% to 70% hexamethylenediammonium suberate with from about 85% to 30% hexamethylene diammonium azelate. As will be understood by those skilled in the art, instead of the diammonium salt, there can be used initially equimolecular amounts of the diamine and dicarboxylic acid which on contact forms the salt.

In the preferred embodiment of this invention, a heat plasticizable polyamide of the type described above is milled together with a non-ionic, hydroxylated dispersing agent at temperatures sufficient to plasticize the mass (which may be as high as 120° C. or higher, depending on the softening point of the polymer) in an efficient milling and shearing device. A suitable device is a rotary Banbury mill, the block and rotors of which can be heated by steam (ordinary pressure or high pressure steam). Preferably, another dispersing agent of the anion-active type is used in conjunction with the non-ionic dispersing agent. When the mass is thoroughly dispersed and homogeneous, water is added gradually at a temperature not higher than 100° C., while mechanical working is continued. Shortly, a water-in-polymer dispersion is formed which, on continued gradual addition of water, inverts to a polymer-in-water dispersion. At the point of inversion, the dispersion is very thick and usually contains at least 50% polymer. It may be readily thinned out with water to any desired solids concentra-

Example I

Two hundred and ninety parts of a N-methoxymethyl polyhexamethylene adipamide having 45% of its amide groups substituted with methoxymethyl groups was milled in a Banbury mixer at 110° C. To it was added 17.5 parts of a partially hydrolyzed polyvinyl acetate having a saponification number between 137 and 167 and whose 4% aqueous solution has a viscosity of 35–45 centipoises at 20° C., and 1.95 parts of sodium lauryl sulfate. The steam used to heat the mixer was then turned off and the gradual addition of water was begun. At first because of the high temperature most of the water was volatilized, but as the temperature decreased a smooth water-in-polymer emulsion was formed. On continued gradual addition of water this dispersion inverted to a thick, paste-like polymer-in-water dispersion. This paste was thinned out by the further addition of water to a more fluid consistency. The final emulsion had a solids content of 28.2%. Average particle size was in the range 10–15 microns. On flowing the emulsion out on a glass plate and allowing to air dry at room temperature, a continuous, strong, transparent film was obtained.

The N-methoxymethyl polyhexamethylene adipamide used in this example was obtained by the following procedure: A mixture of 500 parts polyhexamethylene adipamide, 500 parts paraformaldehyde and 775 parts methanol was heated to 140° C. and 17.5 parts of 85% phosphoric was added to the reaction vessel. Eight minutes after the acid was added the contents of the reaction vessel were discharged into methanol containing sufficient ammonia to neutralize the phosphoric acid. The N-methoxymethyl polyhexamethylene adipamide was precipitated from this solution by the addition of water. The polymer mass was freed of excess reagents by washing with water. After drying this material had a methoxyl content corresponding to about 45% substitution of the amide groups with methoxymethyl groups.

Example II

Three hundred parts of a polyamide interpolymer prepared from forty parts of hexamethylenediammonium adipate, thirty parts of hexamethylenediammonium sebacate and thirty parts of caprolactam was milled in a Banbury mixer at a temperature of 120° C. To it was added 60 parts of a partially hydrolyzed polyvinyl acetate having a saponification number of 137–167 and whose 4% aqueous solution has a viscosity of 35–45 centipoises at 20° C. When this dispersing agent had been thoroughly milled into the polymer, the heat on the mixer was turned off and the gradual addition of water was begun. As the temperature of the polymer decreased a water-in-polymer dispersion was formed. On continued gradual addition of water this dispersion inverted to a smooth paste-like polymer-in-water dispersion. This was then thinned somewhat by the further addition of water to give a solids content of approximately 42% for the final emulsion. Average particle size of the polymer particles in the dispersion was approximately 10 microns.

The interpolymer used in the above example was made by heating forty parts hexamethylenediammonium adipate, thirty parts of hexamethylene-diammonium sebacate and thirty parts of caprolactam in an autoclave at 200–220° C. for three hours with pressure maintained at 250 p. s. i., reducing the pressure to atmospheric during the course of two hours while increasing the temperature to 240–250° C., and then holding under a reduced pressure of 30–50 mm. for two hours at this temperature.

Example III

Two hundred and twenty parts of an interpolymer prepared from 35.5 parts of hexamethylenediammonium adipate, 26.5 parts of hexamethylenediammonium sebacate and 38 parts of caprolactam was milled in a Banbury mixer at 120° C. To it was added fifty parts of a plasticiser composed of the commercial mixture of N-ethyl o- and p-toluenesulfonamides. This was followed by the addition of 25 parts of a partially hydrolyzed polyvinyl acetate having a saponification number of 137–167 and whose 4% aqueous solution has a viscosity of 35–45 centipoises at 20° C., and 5 parts of sodium lauryl sulfate. Mixing was continued until the plasticizer and emulsifying agents were thoroughly incorporated in the interpolymer. Then the steam heating the mixer was turned off and the gradual addition of water was begun. As the temperature decreased a smooth, plastic, water-in-polymer dispersion resulted. This dispersion continued to take up water until finally inversion to a polymer-in-water dispersion occurred. At the point of inversion the dispersion contained 53% solids, which is a much higher solids content than can be obtained with the use of any known solvent. This thick paste-like polymer-in-water dispersion could then be thinned readily with water to any desired solids concentration. Reduction in solids content to about 35% gave a relatively fluid dispersion. The polymer particles in the dispersion were very uniform and small, averaging 2–3 microns in size.

The N-substituted polyamides are derived from the high molecular weight linear polycarbonamides which have a unit length (defined in Patents 2,071,253 and 2,130,948) of at least 7, an intrinsic viscosity of at least 0.4 (defined in Patent 2,130,948) and in which the average number of carbon atoms separating the amide groups is at least 2. These fiber-forming polycarbonamides described in the previously mentioned patents are obtained by several methods, for example, by self-polymerization of a monoaminomonocarboxylic acid e. g., 6-aminocaproic acid or 12-aminostearic acid by reacting in substantially equimolecular proportions a dibasic acid, e. g., adipic or sebacic acid with a diamine, e. g., hexamethylenediamine or with a monoaminomonohydric alcohol, e. g., monoethanolamine it being understood that these reactants can be replaced by their equivalent amide-forming derivatives. These linear polyamides also include polyesteramides, for example, those obtained by admixture with other linear polymer-forming reactants, such as glycol-dibasic acid mixtures, or mixtures of hydroxy acids, with the previously mentioned polyamide-forming reactants. On hydrolysis with hydrochloric acid the amino acid polymers yield the amino acid hydrochloride, the diamine-dibasic acid polymers yield the diamine hydrochloride and the dibasic carboxylic acid, and the amino alcohol-dibasic acid polymers yield the amino alcohol hydrochloride and the dibasic carboxylic acid.

In obtaining the N-substituted polyamides, the above described linear polycarbonamides containing hydrogen bearing amide groups as an integral part of the main polymer chain are reacted with formaldehyde and an alcohol in the presence of phosphoric acid or other oxygen containing acid as described in Ser. No. 539,195 already referred to. Suitable N-substituted polyamides are, for example, N-methoxymethyl polyhexamethylenesebacamide, N-isobutoxymethyl polyhexamethyleneadipamide, N-allyloxymethyl polyhexamethyleneadipamide, the N-benzyloxymethyl polyamide derived from a mixture of hexamethylene diamonium adipate and hexamethylenediammonium sebacate, N-furyloxymethylsebacamide, N-(beta-hydroxy) ethoxymethyladipamide, etc.

The reaction for obtaining the N-alkoxymethyl polyamide is conveniently carried out in solution, for example, by dissolving polyhexamethylene adipamide in formic acid of any concentration (usually 70% to 100%) which is a solvent for the polyamide, adding a solution of paraformaldehyde in methanol and allowing the solution to stand at moderate temperatures (60° C.) for about 30 minutes, isolating the reaction product by adding a solution of acetone and water (1:1 by volume) which yields a clear solution from which the N-methoxymethyl polyamide separates after adding excess aqueous ammonia. The reaction temperature can be as low as 0° C. and up to 150° C. if the time is shortened to prevent degradation of the polymer chain. The proportions of reactants can vary considerably. Amounts of formaldehyde as low as 5% by weight based on the polyamide produces a definite change in the properties of the polyamide. In obtaining alcohol soluble polymers, the formaldehyde is preferably used in amount of from 50% to 100% by weight of the polyamide. For optimum conditions the molar ratio of alcohol to formaldehyde is at least one mol, and preferably two mols, per mol of formaldehyde. Quantities of formic acid as low as one half of the weight of the polyamide can be used in the solution method, and since the reaction proceeds in very dilute solutions there is no upper limit to the amount used. This fact applies also to the formaldehyde and alcohol since the presence of a large excess is not detrimental.

The above reaction can also be carried out by heating the polyamide in the solid state with the alcohol, formaldehyde, and a small amount of phosphoric, oxalic, hydroxyacetic, formic or other suitable acid catalyst, at a temperature which is preferably 100° C. to 150° C. but which can range from 20° C. to 250° C. depending on polyamide. In this direct method 1% to 2% (based on polyamide) of many acid catalysts is sufficient while with others as much as 10% may be necessary.

The formaldehyde in the foregoing reactions can be paraformaldehyde, or other forms of formaldehyde such as trioxane, or one of the known formaldehyde-yielding materials. Suitable alcohols comprise methanol, ethanol, propanol-1, propanol-2, the butanols, cyclohexanol, furfuryl alcohol, benzyl alcohol, methoxyethanol, methoxymethoxyethanol, methyl isobutyl carbinol, octyl alcohol, lauryl alcohol, stearyl alcohol, unsaturated alcohols, such as allyl alcohol and oleyl alcohol, alcohols containing additional functional groups, such as ethanol-formamide, beta-hydroxypropionitrile, mercaptoethanol, 2-nitro-1-butanol, glyconitrile, ethylene-chlorohydrin, diacetone alcohol, etc.

The acid catalysts used in obtaining the N-alkoxymethyl polyamides from the foregoing reactants, which are essentially the sole reactants, consist essentially of oxygen-containing acid having an ionization constant at least as great as $9.6 \times 10^{-6}$ and an equivalent conductance, measured at 25° C. in 0.01 N concentration, no greater than 370 ohms$^{-1}$ cm$^2$. Examples of suitable acid catalysts having the equivalent conductance and ionization constant (which refers to the first hydrogen in the case of polybasic acids) previously mentioned are formic, trimethylacetic, trichloroacetic, oxalic, chloroacetic, benzoic, maleic, p-toluenesulfonic acids, phosphoric acid, and acids of phosphorus such as $(CH_3)H_2PO_4$ and $(C_4H_9)H_2PO_4$. To avoid degradation, acids having an equivalent conductance greater than 370 should not be present in substantial amount in the reaction mixture.

The three component interpolyamides which, in addition to the N-alkoxymethyl polyamides just referred to, are suitable ingredients for the practice of this invention, are those described in detail in the U. S. Patent 2,285,009 to which reference should be made for their preparation and properties.

The new dispersions disclosed herein are best made in accordance with the procedure described in the examples, namely, by first milling the polyamide and wetting agent together at a temperature sufficient for the polyamide to become plastic and workable, then adding the water gradually at a temperature below 100° C. while milling is continued. In this method the first step, i. e., milling polyamide and dispersing agent together, can be carried out above the softening point of the polymer if the latter is low-softening, e. g., 50–60° C., or below it, e. g., 110–140° C. for polymers softening up at 160° C. The second step, i. e., the gradual addition of water can be carried out at any temperature up to 100° C. When the first step takes place above 100° C., the temperature can be reduced to 100° C. by turning off the heat supplied to the mixer, or by adding a little water to the mix and utilizing the cooling effect due to evaporation, or both.

It is also possible, however, to disperse the polymer by milling it with a little water at or below 100° C., adding the dispersing agent to the plastic mass and continuing milling and adding water, or to mill the polymer at or below 100° C. with a concentrated aqueous solution of the emulsifying agent, then gradually adding more water. The process described in the examples is preferred because the water-free polymer is stiff and thus provides the high shearing forces necessary to give a good dispersion of the material.

Any of the known organic dispersing (emulsifying, wetting) agents can be used, whether it be of the non-ionic type, e. g., polyvinyl alcohol, water-soluble partly hydrolyzed polyvinyl acetate, methyl, cellulose, natural gums, etc., or of the anionic type, such as the soaps, the sodium salts of long chain alkyl sulfates and sulfonates, ammonium oleates, etc., or of the cationic type such as stearyl tri-methylammonium bromide, cetyl pyridinium bromide, etc. Commercial products such as technical sodium dodecyl sulfate, sorbitan monooleate modified with ethylene oxide, a sodium hydrocarbon sulfonate, a sodium aryl ether sulfate, etc., are suitable. Some of these agents are, of course, more effective than others. In particular, it is desirable to avoid foaming within the mixing apparatus. For this reason, the non-ionic dispersing agents are preferred. A combination of a non-ionic agent such as polyvinyl alcohol with an anionic agent such as soap or sodium dodecyl sulfate is particularly valuable because of the excellent results obtained.

In general, from 1-5% by weight of dispersing agent, based on the total dispersion, is sufficient. It may be desirable, however, particularly when an anionic or cationic agent is used alone, to increase this amount, e. g., up to 20%. The emulsifying agent may be formed in situ, for example by mixing oleic acid into the polymer, adding sufficient water to form a water-in-polymer dispersion, then adding a base such as sodium hydroxide and more water.

Any suitable mixing apparatus can be used, provided it is sufficiently powerful to mill and shear the stiff polymer mass. A Banbury type mixer is entirely suitable, or an ordinary rubber mill may be used. A dough mixer, for example a Werner and Pfleiderer mixer, may be used if the mass is sufficiently plastic to be workable in this type of equipment. The apparatus used must, of course, be provided with means for heating the rolls.

The polyamide material is preferably employed as the major constituent of the solids present in the dispersion and is usually used alone. Plasticizers can be included, if desired, up to 50% by weight of the polyamide. The presence of a plasticizer makes the process of dispersion easier since lower milling temperatures can be used, thus making for more rapid incorporation of water. Suitable plasticizers include the sulfonamides, such as the commercial mixture of N-ethyl-o and p-toluene-sulfonamides, diphenylol octadecane, methyl-10-phenylol stearate, etc. Also, other materials such as pigments, fillers, resins, etc., may be added to the polyamide.

The practice of this invention makes possible the production of valuable aqueous dispersions of polyamides which are completely free from organic solvent or extraneous organic materials, except for the small quantity which may be present as plasticizer, etc. These dispersions are very stable. They have the further unique advantage of having much higher solids contents than any polyamide dispersions heretofore known. Dispersions having solids contents up to 70% by weight of the liquid dispersion, or even higher, can be readily prepared, as contrasted with the previously disclosed aqueous polyamide suspensions which have a maximum concentration of about 13%. For most uses, a solids content of 20-50% is generally preferred. This increase in solids contents over the dispersions of the art greatly decreases the cost of using the material, for example in coating compositions, since it means that fewer coatings or impregnations are required for a given deposit of material.

The aqueous dispersions of this invention give uniform films on evaporation. They are specially useful for coating surfaces such as cloth, leather, wood, metal, brick, etc.

As many apparently widely different embodiments of this invention may be made without departing from the spirit and scope thereof, it is to be understood that I do not limit myself to the specific embodiments thereof except as defined in the appended claims.

I claim:

1. A stable aqueous dispersion of synthetic linear polyamide which contains at least 20% by weight of the dispersed polyamide and in which the liquid medium consists of water, said polyamide having a unit length of at least 7 and an average number of carbon atoms of at least 2 separating the amide groups and being selected from the group consisting of (a) N-substituted polyamides and (b) interpolyamides, said N-substituted polyamides having as the nitrogen substituent the substituent $-CH_2OR$ contained in the recurring group

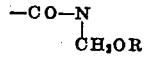

wherein R is a hydrocarbon radical, said recurring groups being present in an amount which renders said N-substituted polyamide soluble to the extent of at least 15% in 80% aqueous ethanol at a temperature of from 50° C. to 75° C., said interpolyamides consisting essentially of the interpolymerization product of 20% to 60% of 6-amino-caproic acid, and of at least 10% each of at least two of the polyamide-forming compositions consisting of (a) hexamethylenediammonium adipate (b) hexamethylenediammonium sebacate and (c) a mixture of from 15% to 70% hexamethylenediammonium suberate with 85% to 30% hexamethylene diammonium azelate.

2. A process for making aqueous dispersions from a synthetic linear polyamide capable of being rendered plastic by mechanical working below 100° C., in the presence of liquid medium consisting of water, said process comprising milling the water gradually at a temperature below 100° C. into said polyamide in contact with a water-soluble organic dispersing agent, and continuing said milling until a polyamide-in-water dispersion is formed, said polyamide having a unit length of at least 7 and an average number of carbon atoms of at least 2 separating the amide groups and being selected from the group consisting of (a) N-substituted polyamides and (b) interpolyamides, said N-substituted polyamides having as the nitrogen substituent the substituent $-CH_2OR$ contained in the recurring group

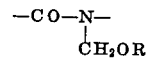

wherein R is a hydrocarbon radical, said recurring groups being present in an amount which renders said N-substituted polyamide soluble to the extent of at least 15% in 80% aqueous ethanol at a temperature of from 50° C. to 75° C., said interpolyamides consisting essentially of the interpolymerization products of 20% to 60% of 6-aminocaproic acid, and of at least 10% each of at least two of the polyamine-forming compositions consisting of (a) hexamethylenediammonium adipate, (b) hexamethylenediammonium sebacate and (c) a mixture of from 15% to 70% hexamethylenediammonium suberate with 85% to 30% hexamethylenediammonium azelate.

THEODORE LE SUEUR CAIRNS.

REFERENCES CITED

The following references are of record in the file of this patent:

UNITED STATES PATENTS

| Number | Name | Date |
|---|---|---|
| 1,843,943 | Carnie | Feb. 9, 1932 |
| 2,208,980 | Horii | July 23, 1940 |
| 2,290,794 | Alvarado et al. | July 21, 1942 |
| 2,293,164 | Myers | Aug. 18, 1942 |
| 2,335,930 | Freeland et al. | Dec. 7, 1943 |
| 2,342,387 | Catlin | Feb. 22, 1944 |
| 2,405,965 | Leekley | Aug. 20, 1946 |

OTHER REFERENCES

Patterson, Institute of Rubber Ind., June 1932, page 88.